Patented Sept. 17, 1946

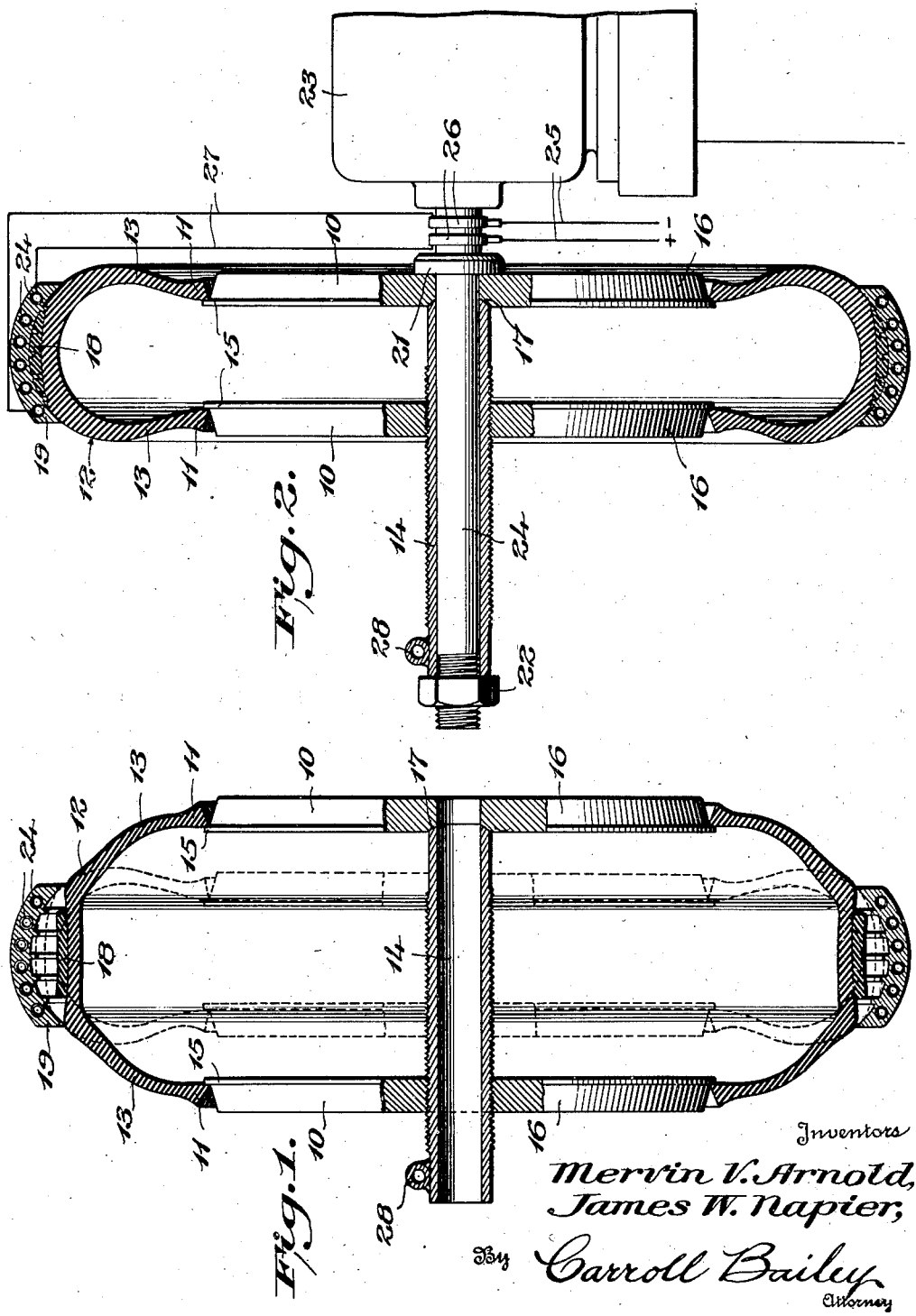

2,407,806

UNITED STATES PATENT OFFICE 2,407,806

APPARATUS FOR APPLYING TREAD MATERIAL TO TIRE CASINGS

Mervin V. Arnold, Clay, N. Y., and James W. Napier, Macon, Ga.

Application May 21, 1943, Serial No. 487,946

11 Claims. (Cl. 18—18)

This invention relates to means for retreading worn pneumatic tire casings or, if desired, for applying original tread material to new tire casings either during course of their manufacture or at any time following their manufacture as commercial products, and has for its general object to provide a simple, practical means whereby tread material may be applied to either worn or new pneumatic tire casings rapidly, expeditiously, at low cost and in a dynamically balanced manner.

With the foregoing general object in view the invention consists in the novel features of construction, combination and arrangements of the means, as will be hereinafter more fully described, illustrated in the accompanying drawing and defined in the appended claims.

In the accompanying drawing, wherein like characters of reference denote corresponding parts in the different views:

Figure 1 is a central, longitudinal sectional view through a worn tire casing and through means constructed in accordance with one practical embodiment of the invention for spreading apart the side walls of said casing to reduce the outside diameter of the latter, this view showing by full lines the casing side walls spread apart by said means, a retreading band of material applied to the worn peripheral portion of the casing and a mold operatively positioned around the casing and, by dotted lines, retracted positions of the casing side walls and the casing with the retreading material thereon expanded into the mold; and Figure 2 is a view similar to Fig. 1 showing the tire casing expanded into the mold and operatively mounted, through the instrumentality of the side wall spreading means, upon a shaft for rotation by the latter.

Referring now in detail to the accompanying drawing which is illustrative of one practical means for practicing the present invention, 10, 10' designate a pair of members to be suitably engaged with the bead portions 11, 11 of a tire casing 12 and to be moved apart or separated for the purpose of spreading apart the side walls 13, 13 of said casing to reduce the outside diameter thereof, and 14 designates an arbor operatively associated with said members 10, 10' and affording a means of spreading them apart.

Preferably the members 10, 10' are of suitable design to fit into the casing bead portions 11, 11 to maintain the circular form thereof and to engage the inner side faces of said bead portions so that when they are spread apart they serve to correspondingly spread apart the casing side walls 13. In this connection and as illustrated by way of example in the drawing, the members 10, 10' may be in the form of solid, circular disks of metal or other suitable material each having an annular, peripheral flange 15 projecting outwardly from its inner side portion for engagement with the inner side face of the related bead portion 11 of the tire casing 12 and each having its outer side portion 16, at least adjacent to the flange 15, of a diameter to fit snugly into the related bead portion 11 to maintain the circular form thereof. Preferably the outer side portions 16 of said disks are tapered outwardly, as shown, to facilitate their engagement in the bead portions 11, but this is not essential and the said outer portions of said disks may be of cylindrical or any other desired form. In any event, it will be understood that pairs of the members 10, 10' of different diameters or sizes are provided for use with tire casings of different diameters or sizes.

While any suitable means may be provided for moving apart or separating the members 10, 10', an arbor, such as the arbor 14, preferably is employed for this purpose because it is a simple, practical means for the purpose and also because it affords a simple, practical instrumentality of mounting the tire casing for rotation. As illustrated in the drawing, the arbor 14 is of hollow or tubular form and at one end has swivel or rotary abutting engagement with the inner side of the member 10' centrally thereof, as indicated at 17. In addition, it is externally threaded and has the member 10 centrally threaded thereon. Thus, assuming non-rotation of the members 10, 10', it is apparent that by rotating said arbor in one direction said members will be forced apart, while by rotating the same in the opposite direction said members will be permitted to move together or approach each other.

Following operative engagement of the members 10, 10' with the bead portions of a tire casing 12 in the manner shown in the drawing, said members are moved apart by rotation of the arbor 14 or in any other desired manner to spread apart the side walls 13, 13 of the said casing and thereby reduce the outside diameter thereof, as shown by full lines in Fig. 1. Subsequently to or following this operation, a band 18 of uncured or unvulcanized natural or synthetic retreading rubber or its equivalent is applied to the peripheral portion of the tire casing. Then, while the side walls of the tire casing remain spread apart and said casing is of reduced outside diameter, an annular mold 19 is engaged over said casing or, alternatively and equivalently, the casing is placed in said mold. The arbor 14 then is rotated in a direction either to move the members 10, 10' toward one another or to permit them to move toward one another under the influence of the force exerted inwardly thereon by the spread apart side walls of the tire casing tending to return to their normal positions, and this inward moving of said members is continued until the tire casing, with the band 18 of tread material thereon, has expanded to or substantially to its normal diameter into tight engagement with the mold 19, but is stopped prior to complete return of the casing side walls to their normal positions so that the members 10, 10' remain firmly engaged with the beads 11, 11.

The arbor 14, with the members 10, 10', the tire casing 12 and the mold 19 assembled therewith, then is slipped over a rotatable shaft 20 and is fastened thereto for rotation therewith in any suitable manner as, for example, by abutting the outer face of the central or hub portion of the member 10' with a suitable abutment 21 on the shaft 20 and by threading a clamp nut 22 on the shaft 20 tightly against the outer end of the arbor 14.

After the arbor 14 has been fastened to the shaft 20 by the clamp nut 22 or in other appropriate manner, heat is suitably applied to the mold 19 and through said mold to the band 18 of tread material to effect vulcanization thereof and to cause it to become firmly joined to the worn peripheral portion of the tire casing and, simultaneously, the shaft 20 is rotated to rotate the tire casing and the mold at a sufficiently rapid rate of speed to cause the retreading material, under the thus generated centrifugal force, to densify and to conform closely to the contour of the inner face of the mold.

Rotation of the tire casing and the mold and application of heat to the mold are continued over the required period of time to accomplish proper densification and vulcanization of the tread material and to cause it to become firmly joined to the tire casing, whereupon the heat is cut off, rotation of the shaft 20 is discontinued and disassembly of the mold from the tire casing and of the tire casing from the members 10, 10' is effected in a manner just the reverse of the manner of assembly of these elements or in any other suitable manner. The apparatus then is in readiness for the next tread applying series of operations.

The shaft 20 may be rotated manually or it may be power driven in any suitable manner. For example, it may be the armature shaft of an electric motor 23 as illustrated in Fig. 2 of the drawing. Likewise, any suitable means may be provided for heating the mold 19. For example, suitable electric resistance or heater elements 24 may be suitably carried by said mold and current may be supplied to said elements in any suitable manner, as from a suitable source through conductors 25 to slip rings 26 on and insulated from the shaft 20 and from said slip rings to said elements through other conductors 27.

To facilitate rotation of the arbor 14 the same may be suitably formed at its outer end for engagement of a wrench therewith or, as shown, it may be provided with an eye element 28 to have engaged therewith the equivalent of a wrench in the form of a rod or the like.

A distinct advantage of rotating a tire casing to densify the tread material and to cause it to conform in cross section to the cross sectional configuration of the space between the periphery of the casing and the mold is that the tread material inherently tends to become dynamically balanced under the centrifugal force generated by rotation of the casing. Moreover, it is apparent that, if desired, liquid or solid matter may be introduced into any given casing to assist centrifugal force in urging the casing outwardly to subject the applied tread material to the desired pressure between the casing and the mold.

From the foregoing description considered in connection with the accompanying drawing, it is believed that the novel features and the decided advantages of the present tire casing retreading means will be readily understood and appreciated. It is desired to point out, however, that the invention is not limited to the specific method steps nor to the structure specifically illustrated and described, but may be practiced by various specifically different structures, all within its spirit and scope as defined in the appended claims.

We claim:

1. Apparatus of the character described comprising a rotatable hollow arbor to be engaged over and secured to a rotatable shaft for rotation by the latter, a pair of members supported by said arbor coaxially therewith for rotation therewith, said members having portions for engagement with the inner edges of the bead portions, respectively, of a tire casing to mount the casing upon said members and said arbor concentrically with respect to the latter for rotation therewith, said members further having portions fixed with respect thereto for engagement with the inner faces of the side walls of a tire casing mounted upon said members whereby relative outward movement of said members is effective to spread apart the side walls of the casing, and at least one of said members being mounted upon said arbor for movement therealong away from and toward the other member to spread apart and to release for contraction the side walls of a tire casing mounted upon said members.

2. Apparatus of the character described comprising a rotatable exteriorly threaded hollow arbor to be engaged over and secured to a rotatable shaft for rotation by the latter, a pair of members supported by said arbor coaxially therewith for rotation therewith, said members having portions for engagement with the inner edges of the bead portions, respectively, of a tire casing to mount the casing upon said members and said arbor concentrically with respect to the latter for rotation therewith, said members further having portions for engagement with the inner faces of the side walls of a tire casing mounted upon said members, and at least one of said members being threaded upon said arbor for movement therealong away from and toward the other member to spread apart and to release for contraction the side walls of a tire casing mounted upon said members.

3. Apparatus of the character described comprising a rotatable exteriorly threaded hollow arbor to be engaged over and secured to a rotatable shaft for rotation by the latter, a pair of disks supported by said arbor coaxially therewith for rotation therewith and to fit snugly into the bead portions, respectively, of a tire casing to mount the casing upon said disks and said arbor concentrically with respect to the latter for rotation therewith, said disks having marginal flanges for engagement with the inner side faces of the bead portions of a tire casing mounted upon said disks, and at least one of said disks being threaded upon said arbor for movement therealong away from and toward the other disk to spread apart and to release for contraction the side walls of a tire casing mounted upon said disks.

4. Apparatus of the character described comprising a rotatable hollow arbor to be engaged over and secured to a rotatable shaft for rotation by the latter, a pair of disks supported by said arbor coaxially therewith for rotation therewith, the peripheries of said disks being outwardly tapered to fit snugly into the bead portions, respectively, of a tire casing to mount the casing upon said disks and said arbor concentrically with respect to the latter for rotation therewith, said disks having marginal flanges for engagement with the inner faces of the bead portions of a tire casing mounted upon said disks, and at least one of said disks being mounted upon said arbor for movement therealong away from and toward the other disk to spread apart and to release for contraction the side walls of a tire casing mounted upon said disks.

5. Apparatus of the character described comprising a rotatable exteriorly threaded arbor, a pair of members supported by said arbor coaxially therewith for rotation therewith, said members having portions for engagement with the inner edges of the bead portions, respectively, of a tire casing to mount the casing upon said members and said arbor concentrically with respect to the latter for rotation therewith, said members further having portions for engagement with the inner faces of the side walls of a tire casing mounted upon said members, one end of said arbor abutting one of said members and the other of said members being threaded upon said arbor for movement therealong away from and toward said first mentioned member to spread apart and to release for contraction the side walls of a tire casing mounted upon said members.

6. Apparatus as set forth in claim 5 in which the arbor is hollow to be engaged over and to be secured to a rotatable shaft for rotation by the latter.

7. Apparatus as set forth in claim 5 including a rotatable shaft, and means to mount the arbor thereon coaxially therewith for rotation by the same.

8. Apparatus of the character described comprising a rotatable shaft, a rotatable arbor, means to mount said arbor upon said shaft coaxially therewith for rotation by the same, a pair of members supported by said arbor coaxially therewith for rotation therewith, said members having portions for engagement with the inner edges of the bead portions, respectively, of a tire casing to mount the casing upon said members and said arbor concentrically with respect to the latter for rotation therewith, said members further having portions fixed with respect thereto for engagement with the inner faces of the side walls of a tire casing mounted upon said members whereby relative outward movement of said members is effective to spread apart the side walls of the casing, and at least one of said members being mounted upon said arbor for movement therealong away from and toward the other member to spread apart and to release for contraction the side walls of a tire casing mounted upon said members.

9. Apparatus of the character described comprising a rotatable shaft, a rotatable exteriorly threaded arbor, means to mount said arbor upon said shaft coaxially therewith for rotation by the same, a pair of members supported by said arbor coaxially therewith for rotation therewith, said members having portions for engagement with the inner edges of the bead portions, respectively, of a tire casing to mount the casing upon said members and said arbor concentrically with respect to the latter for rotation therewith, said members further having portions for engagement with the inner faces of the side walls of a tire casing mounted upon said members, and at least one of said members being threaded upon said arbor for movement therealong away from and toward the other member to spread apart and to release for contraction the side walls of a tire casing mounted upon said members.

10. Apparatus of the character described comprising a rotatable shaft, a rotatable exteriorly threaded arbor, means to mount said arbor upon said shaft coaxially therewith for rotation by the same, a pair of disks supported by said arbor coaxially therewith for rotation therewith and to fit snugly into the bead portions, respectively, of a tire casing to mount the casing upon said disks and said arbor concentrically with respect to the latter for rotation therewith, said disks having marginal flanges for engagement with the inner side faces of the bead portions of a tire casing mounted upon said disks, and at least one of said disks being threaded upon said arbor for movement therealong away from and toward the other disk to spread apart and to release for contraction the side walls of a tire casing mounted upon said disks.

11. Apparatus of the character described comprising a rotatable shaft, a rotatable arbor, means to mount said arbor upon said shaft coaxially therewith for rotation by the same, a pair of disks supported by said arbor coaxially therewith for rotation therewith, the peripheries of said disks being outwardly tapered to fit snugly into the bead portions, respectively, of a tire casing to mount the casing upon said disks and said arbor concentrically with respect to the latter for rotation therewith, said disks having marginal flanges for engagement with the inner faces of the bead portions of a tire casing mounted upon said disks, and at least one of said disks being mounted upon said arbor for movement therealong away from and toward the other disk to spread apart and to release for contraction the side walls of a tire casing mounted upon said disks.

MERVIN V. ARNOLD.
JAMES W. NAPIER.